(12) United States Patent
Nock et al.

(10) Patent No.: US 12,531,433 B2
(45) Date of Patent: Jan. 20, 2026

(54) SYSTEM, METHOD, AND DEVICE FOR AUTOMATED ENERGY REMEDIATION

(71) Applicants: Carnegie Mellon University, Pittsburgh, PA (US); University of Maryland, College Park, College Park, MD (US)

(72) Inventors: Destenie Nock, Pittsburgh, PA (US); Shuchen Cong, Pittsburgh, PA (US); Yueming Qiu, College Park, MD (US)

(73) Assignees: Carnegie Mellon University, Pittsburgh, PA (US); University of Maryland, College Park, College Park, MD (US)

( * ) Notice: Subject to any disclaimer, the term of this patent is extended or adjusted under 35 U.S.C. 154(b) by 305 days.

(21) Appl. No.: 18/236,530

(22) Filed: Aug. 22, 2023

(65) Prior Publication Data

US 2024/0072569 A1 Feb. 29, 2024

Related U.S. Application Data

(60) Provisional application No. 63/400,086, filed on Aug. 23, 2022.

(51) Int. Cl.
 *H02J 13/00* (2006.01)
 *H02J 3/00* (2006.01)
(52) U.S. Cl.
 CPC ...... *H02J 13/00002* (2020.01); *H02J 3/0012* (2020.01)

(58) Field of Classification Search
 CPC ....... H02J 13/00002; H02J 3/0012; H02J 3/14
 See application file for complete search history.

(56) References Cited

U.S. PATENT DOCUMENTS

| | | | | |
|---|---|---|---|---|
| 12,354,174 B2* | 7/2025 | Turney | ................ | G06Q 20/145 |
| 2018/0284758 A1* | 10/2018 | Cella | ........................ | H02M 1/12 |
| 2019/0324444 A1* | 10/2019 | Cella | ........................ | H04L 67/12 |

(Continued)

OTHER PUBLICATIONS

ASHRAE Guideline 14-2002, Measurement of Energy and Demand Savings, 2002, 170 pages.

(Continued)

*Primary Examiner* — Ziaul Karim
(74) *Attorney, Agent, or Firm* — The Webb Law Firm

(57) ABSTRACT

Provided is a system, method, and device for automated energy remediation. The system includes at least one processor programmed or configured to: store energy usage data for a plurality of households, store environmental data associated with the plurality of households, the environmental data including outdoor temperature measurements, determine an inflection temperature for each household of the plurality of households based on a nonlinear regression model, determine a gap metric value based on a maximum median inflection temperature and a minimum inflection temperature from the plurality of households, form a plurality of groups based on the plurality of households and household data associated with each household, each group including a subset of households of the plurality of households, determine at least one group of the plurality of groups, and automatically initiate at least one energy protocol for households in the at least one group.

13 Claims, 5 Drawing Sheets

(56) References Cited

U.S. PATENT DOCUMENTS

| | | | | |
|---|---|---|---|---|
| 2019/0339688 | A1* | 11/2019 | Cella | G06N 3/0464 |
| 2020/0073342 | A1* | 3/2020 | Lee | G05B 17/02 |
| 2020/0076196 | A1* | 3/2020 | Lee | H02J 3/008 |
| 2020/0133257 | A1* | 4/2020 | Cella | G06N 3/0464 |
| 2021/0003308 | A1* | 1/2021 | Venne | G05B 19/042 |

OTHER PUBLICATIONS

Brown et al., "Modeling climate-driven changes in U.S. buildings energy demand", Climate Change, 2016, pp. 29-34.

Chong, "Building vintage and electricity use: Old homes use less electricity in hot weather", European Economic Review 56, 2012, pp. 906-930.

Dang et al., "Does Hotter Temperature Increase Poverty? Global Evidence from Subnational Data Analysis", I Z A Institute of Labor Economics, May 2022, 64 pages.

Fazeli et al., "Temperature response functions for residential energy demand—A review of models", Urban Climate 15, 2016, pp. 45-59.

He et al., "The weather affects air conditioner purchases to fill the energy efficiency gap", Nature Communications, 2022, pp. 1-8.

Jessel et al., "Energy, Poverty, and Health in Climate Change: A Comprehensive Review of an Emerging Literature", Frontiers in Public Health, Dec. 2019, pp. 1-19, vol. 7, Article 357.

Scheier et al., "A measurement strategy to address disparities across household energy burdens", Nature Communications, 2022, pp. 1-11.

Sonora, "A Panel Analysis of Income Inequality and Energy Use", MPRA (Munich Personal RePEc Archive), 2018, 38 pages.

Sorrell, "Reducing energy demand: A review of issues, challenges and approaches", Renewable and Sustainable Energy Reviews 47, 2015, pp. 74-82.

Tong et al., "Measuring social equity in urban energy use and interventions using fine-scale data", PNAS, 2021, pp. 1-10, vol. 118, No. 24.

\* cited by examiner

SYSTEM, METHOD, AND DEVICE FOR AUTOMATED ENERGY REMEDIATION

CROSS REFERENCE TO RELATED APPLICATION

This application claims the benefit of U.S. Provisional Patent Application No. 63/400,086 filed Aug. 23, 2022, the disclosure of which is hereby incorporated by reference in its entirety.

GOVERNMENT RIGHTS

This invention was made with U.S. Government support under 1757329 and 2029511 awarded by the National Science Foundation. The Government has certain rights in the invention.

BACKGROUND

1. Field

The technology of the disclosure relates generally to energy use analysis and remediation and, in non-limiting embodiments, to systems, methods, and devices for automated energy remediation.

2. Technical Considerations

Energy poverty manifests itself in a high percentage of income spent covering energy bills, increased risk of electricity shutoffs, and a household's inability to maintain comfortable indoor temperatures or use desired services (e.g., air conditioning, heat, computers). An often-overlooked space in energy poverty analysis lies in the cavity between metrics that measure financial stress (energy burden defined as energy expenditure over total income) and complete lack of energy services (utility shutoffs). Within this cavity are the households which limit their energy consumption to reduce financial strain. These households may appear to spend small amounts of their income on their energy bills while limiting enough energy to avoid having the utility cut their power supply. It is estimated that, annually, 1300 people die every year in the U.S. from extreme heat. In 2009 and 2010 alone, over 8250 emergency room visits in the US were caused by heat stroke, with low-income, minority, and elderly populations being disproportionally affected. A large portion of these deaths may have been prevented if people could cool their homes properly.

As the effects of climate change manifest themselves in heatwaves and deep freezes, communities will need to adapt (e.g., reduce their risk of illness and death) by creating comfortable indoor temperatures within their homes. However, this depends on whether they can rely on their resources for adopting energy-efficient heating and cooling systems, meaning many vulnerable households who limit their energy consumption, potentially putting themselves at risk of heat stroke or hypothermia, may not qualify for energy poverty alleviation under current programs.

Existing energy poverty metrics fall into the following categories: A) primary or secondary, and B) relative or absolute. A primary metric is defined as a metric that directly utilizes consumer-level information. A secondary metric would require derivation to reach a conclusion. A secondary metric includes metrics that aggregate utility information or use weighted scoring for poverty indices. A relative metric compares the energy poverty status of two or more entities (e.g., country-to-country or household-to-household) or one with oneself (e.g., progress over time for one country). Finally, an absolute metric will provide a strict threshold for energy poverty. Relative-secondary metrics for energy poverty use summary statistics from the regional or local level (not individuals) and compare the progress of different regions to some benchmark. Relative-primary metrics come directly from households or individuals, and benchmark feelings of energy poverty in comparison to others in the population. These can be scores from a survey asking questions on self-perception of energy poverty.

Existing data processing techniques are not capable of identifying households without comfortable indoor temperatures who may put themselves at risk of heat-related illnesses. Moreover, existing technological systems lack the capability or functionality to assist such households and/or allow other entities (such as utility providers or governmental entities) to technically assist energy usage and remedial actions.

SUMMARY

According to non-limiting embodiments or aspects, provided is a computer-implemented method for monitoring energy usage comprising: monitoring, with at least one processor, energy usage data for a plurality of households; monitoring, with the at least one processor, environmental data associated with the plurality of households, the environmental data comprising outdoor temperature measurements; determining, with the at least one processor, an inflection temperature for each household of the plurality of households based on a nonlinear regression model, the outdoor temperature measurements, and at least a portion of the energy usage data; determining, with the at least one processor, a gap metric value based on a maximum median inflection temperature and a minimum inflection temperature from the plurality of households; forming, with the at least one processor, a plurality of groups based on the plurality of households and household data associated with each household, each group comprising a subset of households of the plurality of households; determining, with the at least one processor, at least one group of the plurality of groups based on the gap metric value and the inflection temperature for at least a subset of households in the at least one group; and automatically initiating, with the at least one processor, at least one energy protocol for households in the at least one group.

In non-limiting embodiments or aspects, the at least one energy protocol comprises an automated demand response program, and wherein automatically initiating the at least one energy protocol comprises: determining at least one off-peak time based on the energy usage data from the plurality of households; and automatically controlling at least one cooling or heating appliance to operate based on the at least one off-peak time. In non-limiting embodiments or aspects, the at least one energy protocol comprises an energy assistance program, and wherein automatically initiating the at least one energy protocol comprises: automatically registering each household in the at least one group in the energy assistance program. In non-limiting embodiments or aspects, the at least one energy protocol comprises an automated appliance protocol, and wherein automatically initiating the at least one energy protocol comprises: detecting an appliance abnormality in at least one household based on at least one machine-learning model and the energy usage data; and automatically communicating a message to the at least one household in response to detecting the appliance abnormality, the message identifying at least one appliance.

In non-limiting embodiments or aspects, the plurality of households are within a geographic region, and wherein determining at least one group of the plurality of groups based on the gap metric value and the inflection temperature for the at least a subset of households in the at least one group comprises: determining a distance between the gap metric value and the inflection temperature for the at least a subset of households in the a least one group. In non-limiting embodiments or aspects, the nonlinear regression model outputs a cooling or heating balance point, a slope of a component of the cooling or heating balance point, and a daily base load, and wherein determining the at least one group of the plurality of groups is based on the cooling or heating balance point, the slope of a component of the cooling or heating balance point, and the daily base load. In non-limiting embodiments or aspects, wherein automatically initiating the at least one energy protocol comprises: automatically controlling, via a network connection, at least one cooling or heating appliance of at least one household in at least one group based on the energy usage data.

According to non-limiting embodiments or aspects, provided is a system comprising: at least one data storage device; and at least one processor in communication with the at least one data storage device, the at least one processor programmed or configured to: store, in the at least one data storage device, energy usage data for a plurality of households; store, in the at least one data storage device, environmental data associated with the plurality of households, the environmental data comprising outdoor temperature measurements; determine an inflection temperature for each household of the plurality of households based on a nonlinear regression model, the nonlinear regression model configured to receive, as input, the outdoor temperature measurements and at least a portion of the energy usage data, and to output the inflection temperature; determine a gap metric value based on a maximum median inflection temperature and a minimum inflection temperature from the plurality of households; form a plurality of groups based on the plurality of households and household data associated with each household, each group comprising a subset of households of the plurality of households; determine at least one group of the plurality of groups based on the gap metric value and the inflection temperature for at least a subset of households in the at least one group; and automatically initiate at least one energy protocol for households in the at least one group. In non-limiting embodiments or aspects, the at least one energy protocol comprises an automated demand response program, and wherein automatically initiating the at least one energy protocol comprises: determining at least one off-peak time based on the energy usage data from the plurality of households; and automatically controlling at least one cooling or heating appliance to operate based on the at least one off-peak time.

In non-limiting embodiments or aspects, the at least one energy protocol comprises an energy assistance program, and wherein automatically initiating the at least one energy protocol comprises: automatically registering each household in the at least one group in the energy assistance program. In non-limiting embodiments or aspects, the at least one energy protocol comprises an automated appliance protocol, and wherein automatically initiating the at least one energy protocol comprises: detecting an appliance abnormality in at least one household based on at least one machine-learning model and the energy usage data; and automatically communicating a message to the at least one household in response to detecting the appliance abnormality, the message identifying at least one appliance. In non-limiting embodiments or aspects, the plurality of households are within a geographic region, and wherein determining at least one group of the plurality of groups based on the gap metric value and the inflection temperature for the at least a subset of households in the at least one group comprises: determining a distance between the gap metric value and the inflection temperature for the at least a subset of households in the a least one group. In non-limiting embodiments or aspects, the nonlinear regression model outputs a cooling or heating balance point, a slope of a component of the cooling or heating balance point, and a daily base load, and wherein determining the at least one group of the plurality of groups is based on the cooling or heating balance point, the slope of a component of the cooling or heating balance point, and the daily base load. In non-limiting embodiments or aspects, wherein automatically initiating the at least one energy protocol comprises: automatically controlling, via a network connection, at least one cooling or heating appliance of at least one household in at least one group based on the energy usage data.

According to non-limiting embodiments or aspects, provided is a computer program product comprising at least one non-transitory computer-readable medium including program instructions that, when executed by at least one processor, cause the at least one processor to: store, in at least one data storage device, energy usage data for a plurality of households; store, in the at least one data storage device, environmental data associated with the plurality of households, the environmental data comprising outdoor temperature measurements; determine an inflection temperature for each household of the plurality of households based on a nonlinear regression model, the nonlinear regression model configured to receive, as input, the outdoor temperature measurements and at least a portion of the energy usage data, and to output the inflection temperature; determine a gap metric value based on a maximum median inflection temperature and a minimum inflection temperature from the plurality of households; form a plurality of groups based on the plurality of households and household data associated with each household, each group comprising a subset of households of the plurality of households; determine at least one group of the plurality of groups based on the gap metric value and the inflection temperature for at least a subset of households in the at least one group; and automatically initiate at least one energy protocol for households in the at least one group.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1:
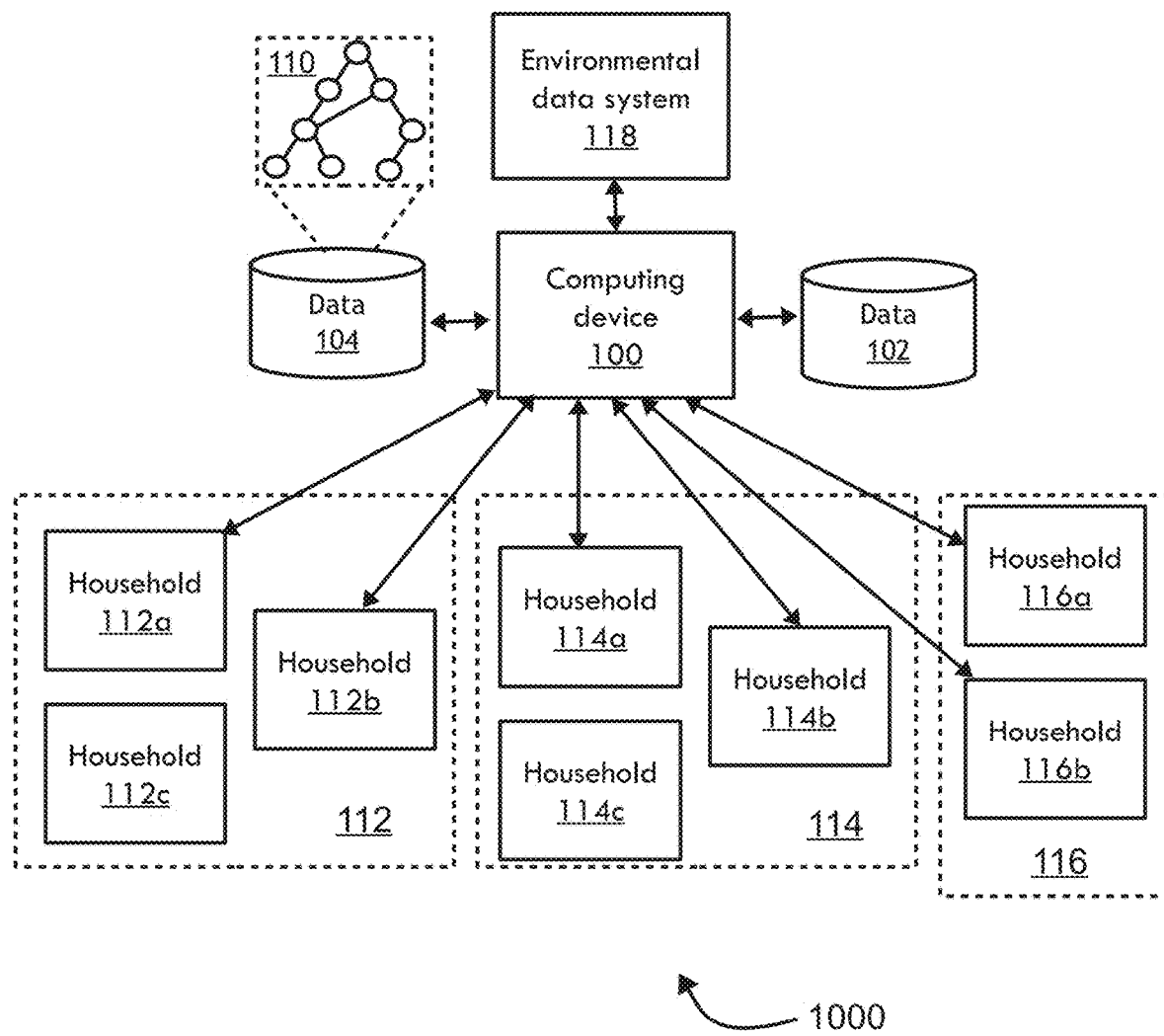
FIG. 1 illustrates a system for automated energy remediation according to non-limiting embodiments or aspects.

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include a GPU, a CPU, a processor, a microprocessor, a controller, a microcontroller, and/or the like. In non-limiting embodiments, a computing device may be comprised of a plurality of circuits.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

In areas where the population has access to modern energy infrastructure, household-level energy poverty manifests itself as having inadequate energy services within the household, or an inability to consume energy at a desired level. Thus, energy poverty may include people who limit their energy consumption (e.g., display energy limiting behavior), and those who spend a large portion of their income on their energy bills (e.g., high energy burden). Non-limiting embodiments address this deficiency with a new metric, a gap metric (e.g., an energy equity gap metric), that is configured to identify energy-limiting behavior and therefore detect instances of potential energy poverty that are not detectable with existing data processing techniques. Energy limiting behavior may include a household's inability or unwillingness to consume enough energy to reach a desired level of comfort. A household may be considered to display energy limiting behavior if they reduce their energy consumption significantly below another household within the same region that does not have a budget constraint for energy spending. For example, assume households A and B live in the same region and have similar preferences for their ideal indoor temperature, around 70° F. (21° C.). Household A is a low-income household (i.e., a budget constraint on energy spending), and Household B is a high-income household (i.e., no budget constraint). If Household B starts using their air conditioning unit when it is 70° F. (21° C.) outside, but Household A waits until it is 75° F. (24° C.) outside, then household A is displaying 5° F. (3° C.) of energy limiting behavior compared to Household B. In addition to capturing household-level electricity consumption behavior, the energy equity gap allows for a cross-temporal comparison of population-level energy equity within a region.

Non-limiting embodiments provide for a system and method for managing energy-using appliances to improve the performance of the electrical grid and/or other utilities and resources. Through automated remedial actions, a reduced load can be achieved while actively improving the comfort levels of households. Other advantages can be realized with non-limiting embodiments as described herein.

Referring now to FIG. 1, a system 1000 for automated energy remediation is shown according to non-limiting embodiments or aspects. The system 1000 includes a computing device 100, such as a server computer, in communication with a plurality of households 112a-c, 114a-c, 116a-b through one or more networks (e.g., the internet and/or other network environments). There may be any number of households, which may refer to a residential unit and its occupants (e.g., a family, an individual, a group of individuals, and/or the like). There may be one or more intermediary systems (not shown in FIG. 1) between the households and computing device 100, such as one or more server computers, third parties, and/or the like. In some non-limiting embodiments, the computing device 100 is in communication with the households indirectly through one or more utility providers (e.g., such as an electricity or gas provider) that monitor energy usage at the households and communicate the usage information to the computing device 100. In some non-limiting embodiments, the computing device 100 may be operated by one or more utility providers or third parties. In some non-limiting embodiments, one or more of the households are in communication with the computing device 100 via one or more appliances in communication with a network. For example, a smart appliance may include a heating system, a heater, a hot water heater, a cooling system, an air conditioner, a washer, a dryer, and/or the like. Utility usage meters may also communicate with the computing device 100 to provide energy usage data.

With continued reference to FIG. 1, the system may include one or more data storage devices 102, 104. For example, a first data storage device 102 may include energy usage data and/or environmental data (e.g., temperature data) associated with the households 112a-c, 114a-c, 116a-b. A second data storage device 104 may include one or more machine-learning models 110, algorithms, and/or the like. It will be appreciated that some non-limiting embodiments may include distributed data storage and/or different types of data. In non-limiting embodiments, computing device 100 receives energy usage data from the households and stores it in the data storage device 102. It will be appreciated that data storage devices 102 and/or 104 may be local or remote to the computing device 100. In non-limiting embodiments, the computing device 100 is in communication with an environmental data system 118, which may include one or more computing devices configured to communicate environmental data (e.g., temperature data). For example, the environmental data system 118 may include a web server, thermometer, and/or the like that provides temperature data associated with one or more of the households. There may be one or more environmental data systems 118 and such systems may be local or remote to the households.

With continued reference to FIG. 1, in non-limiting embodiments the computing device 100 may monitor energy usage data for the households 112a-c, 114a-c, 116a-b. Monitoring the energy usage data may include storing energy usage data in the data storage device 102. The energy usage data may be received in real-time, near real-time, at intervals in batches, and/or the like. The computing device 100 may also monitor environmental data associated with the households. For example, the computing device 100 may receive temperature measurements for a region or regions associated with the households. In some examples, temperature measurements may be based on proximity to a household, an on-site (e.g., at or near the household) thermometer, and/or may be obtained from a nearby weather station. The environmental data may be stored in temporal association with the energy usage data such that outdoor temperature readings correspond to energy usage data.

Still referring to FIG. 1, in non-limiting embodiments, the computing device 100 may determine an inflection temperature for each household of a plurality of households 112a-c, 114a-c, 116a-b based on a model (e.g., a nonlinear regression model), the environmental data, and the energy usage data. For example, the computing device 100 may analyze the data stored in the data storage device 102 at intervals, in response to a request, or on an on-going basis. As an example, the analysis may occur once a week, once a month, once a year, and/or the like. The determination of an inflection temperature may be performed for each individual household or a selection of individual households.

Based on the inflection temperatures from the plurality of households 112a-c, 114a-c, 116a-b, a gap metric value is calculated in non-limiting embodiments. The gap metric value may represent the equity gap, which is a difference in inflection temperatures among different groups (e.g., high and low income groups). The gap may range in size depending on the location, the relative wealth levels of the households, and/or the like.

In non-limiting embodiments, the households 112a-c, 114a-c, 116a-b may be grouped into a plurality of groups 112, 114, 116 based on the plurality of households and household data associated with each household (e.g., such as household income data). As an example, one or more clustering algorithms may be used to form the groups of households. The groups 112, 114, 116 facilitate remedial actions to be taken for each household of a group (e.g., group 112).

Figure 2:
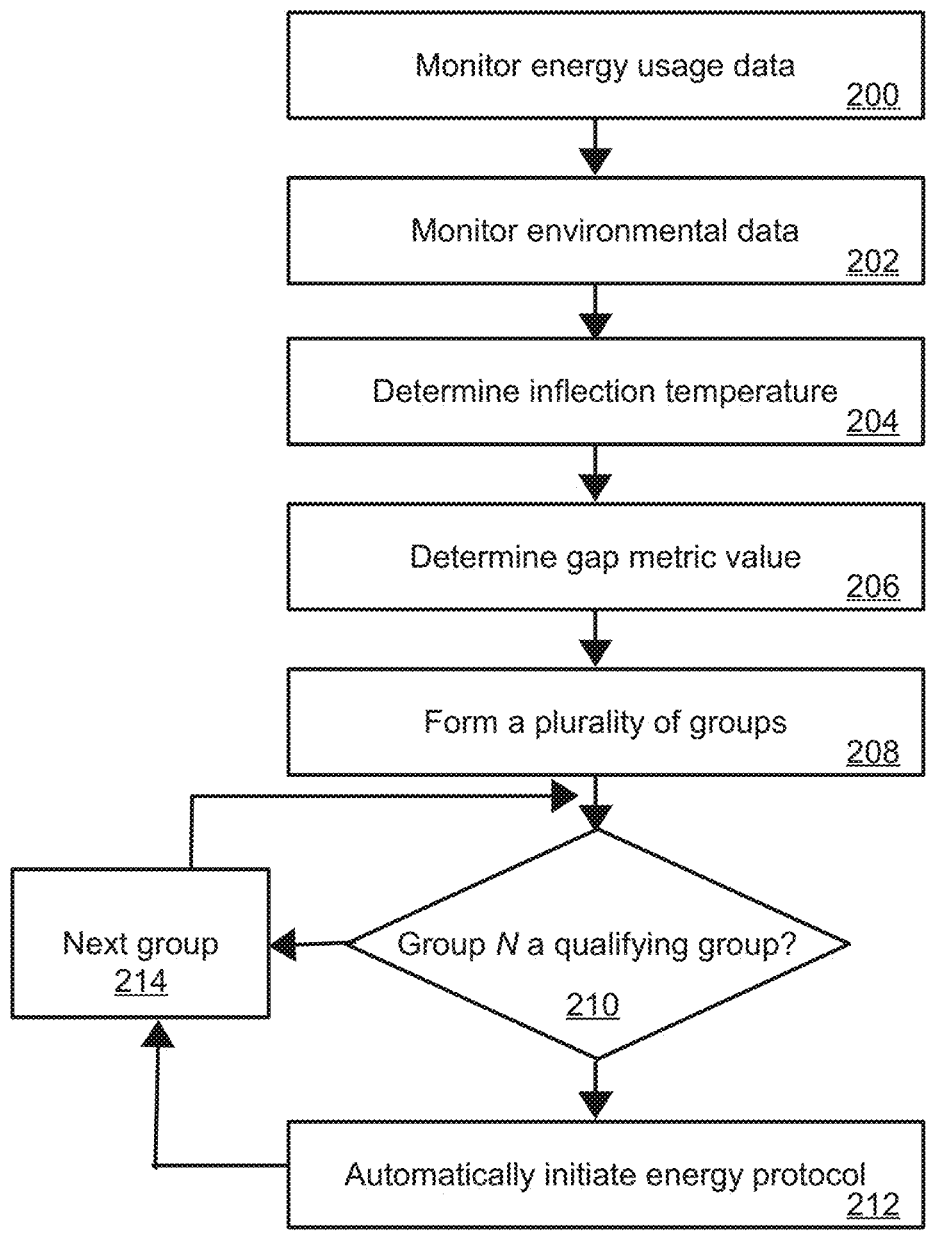
FIG. 2 illustrates a flow diagram for a method of automated energy remediation according to non-limiting embodiments or aspects.

Referring now to FIG. 2, a flow diagram for a method for automated energy remediation is shown according to non-limiting embodiments or aspects. The steps shown in FIG. 2 are for example purposes only, and it will be appreciated that additional, fewer, different, and/or a different order of steps may be used in non-limiting embodiments. In some non-limiting embodiments, a step may be automatically performed in response to performance of a prior step.

At step 200, energy usage data may be monitored for each household of a plurality of households. As described here, energy usage data may be monitored over a network connection and may use data from the household appliances, utility meters (e.g., electrical and gas meters), the utility providers, and/or third-parties. In some non-limiting embodiments, the energy usage data may be received from the households via one or more utility providers (e.g., such as an electricity or gas provider) that monitor energy usage at the households and communicate the usage data. For example, one or more meters may have network capabilities to communicate usage data to a remote server computer. In some non-limiting embodiments, one or more of the households communicate energy use data via one or more appliances in communication with a network. For example, a smart appliance may include a heating system, a heater, a hot water heater, a cooling system, an air conditioner, a washer, a dryer, and/or the like in communication with a remote server via a network connection.

At step 202, environmental data may be monitored for each household of a plurality of households or one or more regions associated with the plurality of households. For example, a server computer may receive temperature measurements for a region or regions associated with the households. In some examples, temperature measurements may be based on proximity to a household, an on-site (e.g., at or near the household) thermometer, and/or may be obtained from a nearby weather station. The environmental data may be stored in temporal association with the energy usage data such that outdoor temperature readings correspond to energy usage data.

At step 204, an inflection temperature may be determined for each household of a plurality of households. The inflection temperature may refer to an outdoor temperature where a household shifts from using its heating system to its cooling system. In some non-limiting examples, there may be a temperature range where the household uses neither heating nor cooling, and the base level energy consumption during that period would be temperature-independent but still an indicator of the shift in energy consumption behavior. A household's inflection temperature may be calculated using a nonlinear regression model which estimates daily electricity consumption of household i on day t ($E_{i,t}$) based on the following variables: daily average temperature ($T_t$), electricity price based on the billing plan of the household and season ($P_{i,s}$), dummy variables of whether day t is a holiday ($H_t$), day-of-the-week fixed effects ($\delta_t$), and monthof-the-year fixed effects ($\mu_t$). In some non-limiting embodiments, when modeling day-of-the-week and month-of-the-year dummy variables, some days (e.g., Wednesday and March, respectively) may be dropped to prevent collinearity. The nonlinear regression model in some non-limiting embodiments may be represented by the following quadratic equation:

$$E_{i,t} = \alpha + \beta_1 \times T_t + \beta_2 \times T_t^2 + \beta_3 \times P_{i,s} + H_t + \delta_t + \mu_t$$

The quadratic equation above models the relationship between daily electricity consumption and daily average temperature. A quadratic relationship is used because it coincides with the shape of the electricity consumption and temperature data, and a median $R^2$ value of 0.8 for all households. The convex shape of the curve confirms the notion that electricity consumption is highly correlated with temperature. The inflection temperature is the minimum electricity consumption point, as shown in the below equation, and signifies the outdoor temperature a household must experience before initiating their cooling (e.g., air conditioning) units.

$$T_{inf} = T_t \text{ when } f'(E_{i,t}) = 0$$

The outliers of the inflection temperature model may be defined as any household with an inflection temperature below 30° F. (−1.1° C.) or above 120° F. (48.9° C.), based on outdoor temperature limit ranges measured within the associated region. An inflection temperature outside of this boundary may indicate incomplete electricity consumption data. In one particular example, the following amount of outliers were filtered out: 0.5% in year one, 1.6% in year two, 1.2% in year three, and 0.2% in year four.

In non-limiting embodiments, to find the inflection temperature of each household, daily electricity consumption is modeled using average daily temperature, electricity pricing plan, holiday effects, and day-of-the-week and/or month-of-the-year fixed effects. The minimum of the quadratic equation between electricity consumption and temperature after controlling for covariates may be defined as the temperature at which people start using their cooling systems (e.g., the inflection temperature) based heating and cooling systems being the largest energy consumer within a household. In some examples, the local climate may alter the approach. For example, a single time period may be used for a region having a warm and dry climate, with short, mild winters and long, high-heat summers. In examples in which the region is in a colder climate or a climate with more distinct seasons, the year may be split into two climate zones (i.e., spring-summer-fall and fall-winter-spring). It will be appreciated that other variations are also possible.

At step 206, a gap metric value is determined for the plurality of households. The gap metric value (e.g., energy equity gap) quantifies the relative energy consumption behavior differences between low- and high-income groups using the inflection temperatures. The energy equity gap for year y, $G_y$, is the maximum median inflection temperature ($\max(T_{inf,median})$) minus the minimum inflection temperature ($\min(T_{inf,median})$) among all income groups. The gap metric value may be determined with the following equation:

$$G_y = \max(T_{inf,median}) - \min(T_{inf,median})$$

At step 208, a plurality of groups are formed. This may be performed before or after step 206. The groups may be formed with one or more clustering algorithms, as an example. The groups may be formed on the basis of household data, such as a household income (e.g., total income for household occupants). In non-limiting embodiments in which the groups are formed before step 206, the gap metric value may be determined by comparing inflection temperatures between different groups (e.g., between low-income and high-income groups). It will be appreciated that other variations are possible.

At step 210, it is determined if each group is a qualifying group. For example, the method may iterate through each group to determine if the group satisfies a threshold. This determination may be based on a distance between an inflection temperature from one household in the group and/or a combination of households (e.g., an average or median value) in the group and the gap metric value. If the group is not qualifying, the method may analyze the next group at steps 214 and 210 until all of the groups are analyzed. A widening gap (a greater difference) may indicate energy poverty. In some examples, there may be multiple thresholds set for different levels of remedies, such that a lower threshold may indicate a potentially at-risk population that receives notices or communications and a higher threshold indicates a more serious or imminent risk that requires more immediate intervention.

In examples, grouping households by income may result in significant P-value results for each year, which indicates that the difference in median inflection temperatures of income groups are statistically significant. In some non-limiting embodiments, the household data in which the groups are formed may include ethnicity, age, type of residence, and/or other parameters.

In response to determining that a group is qualifying, the method may proceed to step 212 in which an energy protocol is automatically initiated. As an example, in non-limiting embodiments in which the households have smart appliances and/or appliances that can be remotely controlled, an energy protocol may include determining at least one off-peak time based on the energy usage data from households (e.g., in a group or the whole plurality) and automatically controlling at least one cooling or heating appliance at the household to operate based on the at least one off-peak time. For example, an air conditioner or heating unit may be remotely turned on at an off-peak time to cool the household at a later time when the electricity grid may be more in demand.

As another example, the energy protocol may include an energy assistance program, and automatically initiating the at least one energy protocol may include automatically registering each household in the at least one group in the energy assistance program. This may include an automated entry into a database to sign-up the household for a program and/or communications (e.g., mailings) regarding the same.

As another example, the energy protocol may include an automated appliance protocol, and automatically initiating the at least one energy protocol may include detecting an appliance abnormality in at least one household based on at least one machine-learning model and the energy usage data and automatically communicating a message to the at least one household in response to detecting the appliance abnormality, the message identifying at least one appliance. For example, one or more machine-learning models may be trained on energy usage data to detect, from inputted energy usage data, one or more abnormalities (e.g., a malfunctioning appliance, an appliance using more energy than expected, and/or the like).

In non-limiting embodiments, an energy protocol may be initiated by a utility provider and/or government agency. For example, weatherization targets/thresholds may be established for a region/population based on adaption to extreme weather events (e.g., heatwaves or the like) and how a particular household or group of households are performing relative to others in the same region or others experiencing similar weather events. As an example, if households with an inflection temperature above 78° F. (25.6° C.) and those that spend more than 10% of their income on meeting their energy needs can be automatically identified and registered in an energy assistance program, it could reduce financial strain and risk of heat-related illnesses in the region. Other inflection temperatures and/or thresholds may be set for other levels of remedies for households suffering from energy poverty.

In non-limiting embodiments, the system described herein may be implemented by utility providers or other entities. For example, third parties can be used for utility consumption data to operate at least partially independent from the utilities. As an example, heat pump sellers may be involved to identify households for heat pumps and the like. In non-limiting embodiments, the output and identification of households may allow for governments, providers, and/or third parties to automatically connect over-consumers with providers of energy efficiency upgrades and automatically connect households lacking infrastructure with providers of energy efficient technologies and weatherization.

In non-limiting embodiments, customized demand response programs may be created. For example, households may sign up to demand response programs, and give utilities and demand response program administrators (e.g., third-party companies from utilities) permission to alter their thermostat setting to make sure the grid stays below capacity during peak hours. Incentives may be offered, but such incentives are likely to attract households that are more likely to under consume. Non-limiting embodiments may implement valley-filling demand-side management, which increases demand during off-peak hours to maintain the capacity during peak hours. For example, if the system can cool a home during the day (off peak hours), and stop cooling after occupants get home (peak hours), the home will still be relatively cool without straining the grid.

Using non-limiting embodiments, over- and under-consumers may be automatically identified based on distance from the gap metric value. Peak-shaving demand response programs can be targeted toward over-consumers, so the system is not turning the thermostat higher during a heatwave for households who are already limiting usage. Valley-filling programs can be targeted toward under-consumers to ensure comfort.

Figure 4:
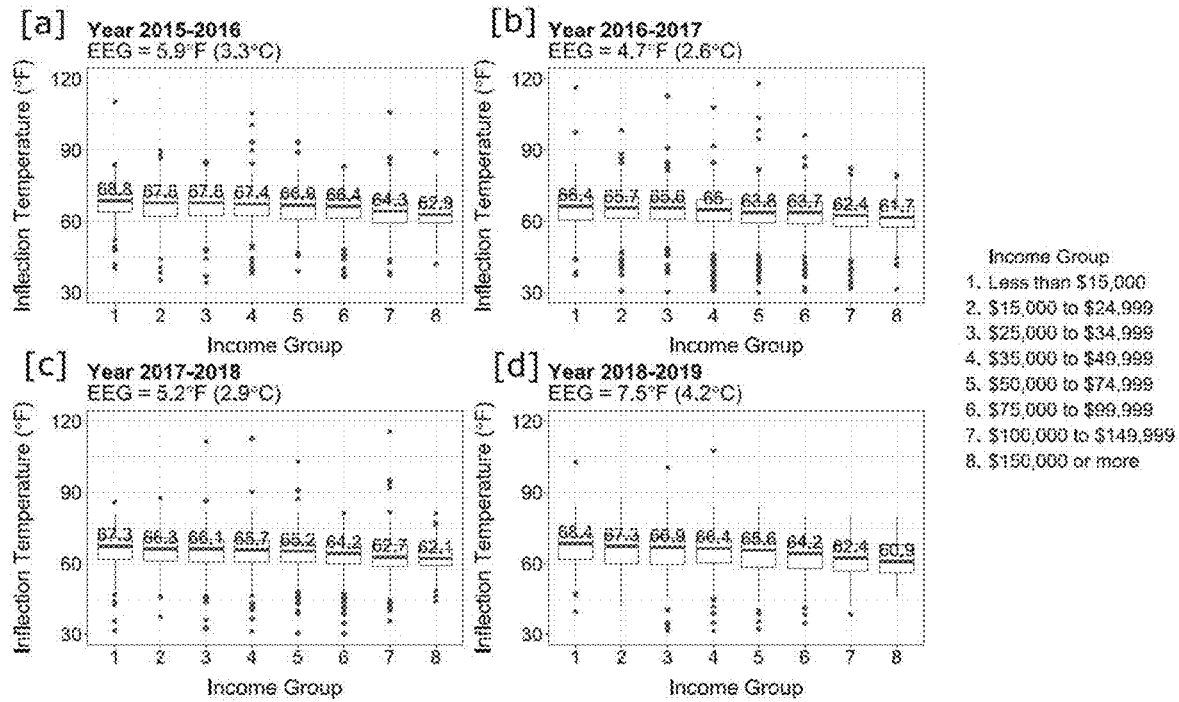
FIG. 4 illustrates sample data for an example implementation of a system for automated energy remediation according to non-limiting embodiments.

Referring to FIG. 4, shown is data for an example implementation of a system for automated energy remediation. The tables show the distribution of inflection temperature across income groups in a sample set of data. The energy equity gap (e.g., gap metric value) for each year is calculated as the difference between the highest and lowest median inflection temperature (indicated by the middle bar and number) among all income groups in all four panels. Income group 1 had the highest and income group 8 had the lowest median inflection temperature. The energy equity gap (EEG) is shown at the top of each panel: (a) 2015-2016 N=4577 households, (b) 2016-2017 N=4522 households, (c) 2017-2018 N=3852 households, (d) 2018-2019 N=2650 households. Each box and whiskers plot indicates the minima and maxima of inflection temperatures of one income group for one year (the lower and upper bound of the whiskers), the first and third quantiles (the lower and upper bound of the box), and the median (the middle line). The outliers are shown as dots on either side of the whiskers.

Figure 5:
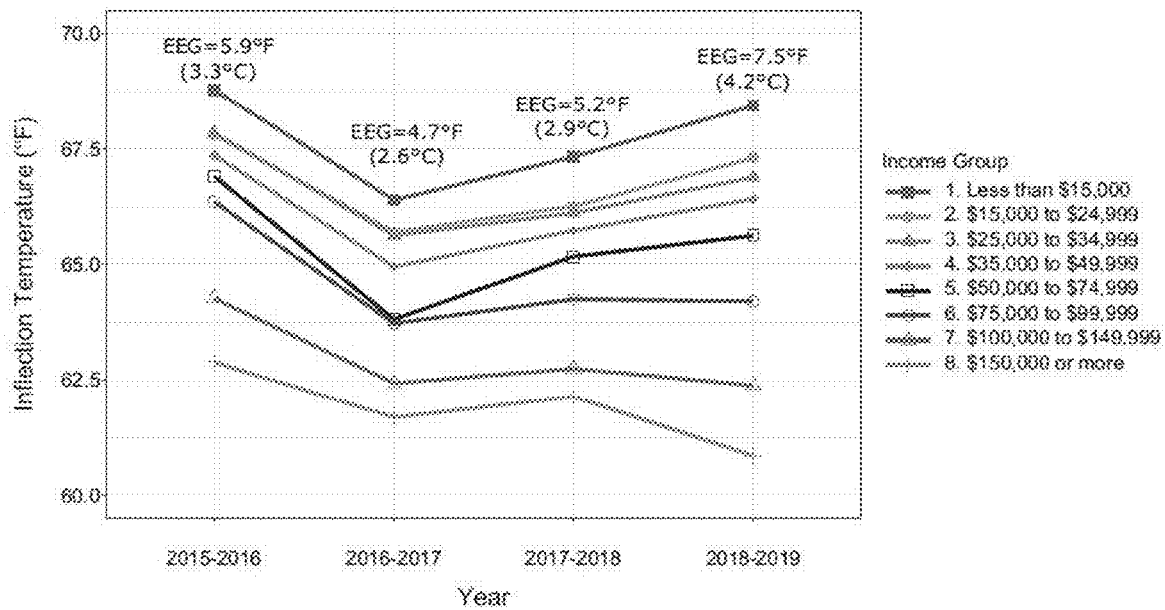
FIG. 5 illustrates a chart showing energy equity gap (EEG) and median inflection temperature changes across different years for sample data for an example implementation of a system for automated energy remediation according to non-limiting embodiments.

Referring to FIG. 5, a chart shows energy equity gap (EEG) and median inflection temperature changes across different years for sample data and one example implementation. Each line represents one income group. Each data point represents the median inflection temperature of the income group for that year.

Figure 6:
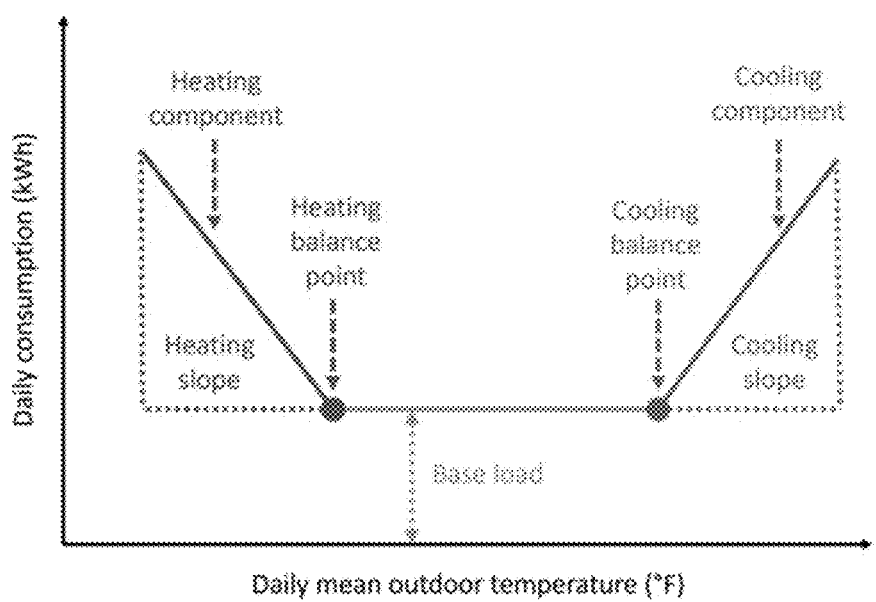
FIG. 6 shows a multi-parameter piecewise linear function used in connection with an example implementation of a system for automated energy remediation according to non-limiting embodiments.

In non-limiting embodiments, a multi-parameter piecewise linear function, such as CalTRACK, may be used to model energy usage and outdoor temperature. For example, using a five-parameter function, non-limiting embodiments may identify several markers of electricity consumption behavior, including the temperature at which a household starts using their cooling and heating systems (cooling and heating balance point), the slopes of the cooling and heating components that indicate how much energy a household uses in response to a 1-degree change in temperature, and the daily base load which indicates the daily non-temperature dependent electricity consumption of a household. In such an example, the five parameters include cooling balance point, heating balance point, the slope of the cooling component in response to change, the slope of the heating component in response to change, and the daily base load. The output of such a model is shown in FIG. 6 according to a non-limiting embodiment. It will be appreciated that more or fewer parameters may also be used in connection with non-limiting embodiments and that the five-parameter function is one example.

In non-limiting embodiments, the disparities in the parameters (e.g., the five parameters shown in FIG. 6) may be identified. Disparities in the parameters of energy behavior across income groups may be analyzed to identify any signs of energy limiting behavior. Using the five-parameter model allows measurement of both cooling and heating balance points, and the period in between where it may be assumed that the household in neither cooling nor heating. However, in non-limiting embodiments using a quadratic model, it may be assumed that the household is either cooling or heating, and the point at which the slope is zero is when the household switches between cooling and heating. It will be appreciated that different models and parameters may be analyzed differently.

Figure 3:
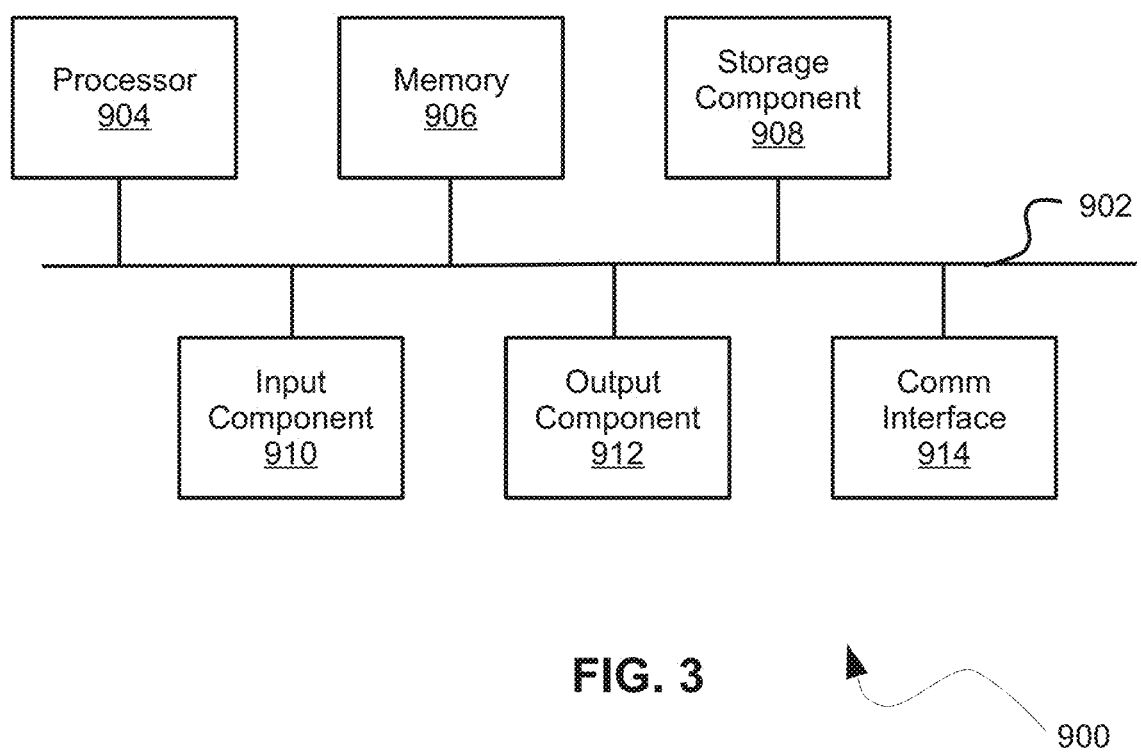
FIG. 3 illustrates example components of a computing device used in connection with non-limiting embodiments.

Referring now to FIG. 3, shown is a diagram of example components of a computing device 900 for implementing and performing the systems and methods described herein according to non-limiting embodiments. In some non-limiting embodiments, device 900 may include additional components, fewer components, different components, or differently arranged components than those shown. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 3, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for monitoring energy usage comprising:
    monitoring, with at least one processor, energy usage data for a plurality of households;
    monitoring, with the at least one processor, environmental data associated with the plurality of households, the environmental data comprising outdoor temperature measurements;
    determining, with the at least one processor, an inflection temperature for each household of the plurality of households based on a nonlinear regression model, the outdoor temperature measurements, and at least a portion of the energy usage data;
    determining, with the at least one processor, a gap metric value based on a maximum median inflection temperature and a minimum inflection temperature from the plurality of households;
    forming, with the at least one processor, a plurality of groups based on the plurality of households and household data associated with each household, each group comprising a subset of households of the plurality of households;
    determining, with the at least one processor, at least one group of the plurality of groups based on the gap metric value and the inflection temperature for at least a subset of households in the at least one group; and
    automatically initiating, with the at least one processor, at least one energy protocol for households in the at least one group, wherein the at least one energy protocol comprises an automated demand response program, and wherein automatically initiating the at least one energy protocol comprises:
        determining at least one off-peak time based on the energy usage data from the plurality of households; and
        automatically controlling at least one cooling or heating appliance to operate based on the at least one off-peak time.

2. The computer-implemented method of claim 1, wherein the at least one energy protocol comprises an energy assistance program, and wherein automatically initiating the at least one energy protocol comprises:
    automatically registering each household in the at least one group in the energy assistance program.

3. The computer-implemented method of claim 1, wherein the at least one energy protocol comprises an automated appliance protocol, and wherein automatically initiating the at least one energy protocol comprises:
    detecting an appliance abnormality in at least one household based on at least one machine-learning model and the energy usage data; and
    automatically communicating a message to the at least one household in response to detecting the appliance abnormality, the message identifying at least one appliance.

4. The computer-implemented method of claim 1, wherein the plurality of households are within a geographic region, and wherein determining at least one group of the plurality of groups based on the gap metric value and the inflection temperature for the at least a subset of households in the at least one group comprises:
    determining a distance between the gap metric value and the inflection temperature for the at least a subset of households in the at least one group.

5. The computer-implemented method of claim 1, wherein the nonlinear regression model outputs a cooling or heating balance point, a slope of a component of the cooling or heating balance point, and a daily base load, and wherein determining the at least one group of the plurality of groups is based on the cooling or heating balance point, the slope of a component of the cooling or heating balance point, and the daily base load.

6. The computer-implemented method of claim 1, wherein automatically initiating the at least one energy protocol comprises:
automatically controlling, via a network connection, the at least one cooling or heating appliance of at least one household in at least one group based on the energy usage data.

7. A system comprising:
at least one data storage device; and
at least one processor in communication with the at least one data storage device, the at least one processor programmed or configured to:
store, in the at least one data storage device, energy usage data for a plurality of households;
store, in the at least one data storage device, environmental data associated with the plurality of households, the environmental data comprising outdoor temperature measurements;
determine an inflection temperature for each household of the plurality of households based on a nonlinear regression model, the nonlinear regression model configured to receive, as input, the outdoor temperature measurements and at least a portion of the energy usage data, and to output the inflection temperature;
determine a gap metric value based on a maximum median inflection temperature and a minimum inflection temperature from the plurality of households;
form a plurality of groups based on the plurality of households and household data associated with each household, each group comprising a subset of households of the plurality of households;
determine at least one group of the plurality of groups based on the gap metric value and the inflection temperature for at least a subset of households in the at least one group; and
automatically initiate at least one energy protocol for households in the at least one group, wherein the at least one energy protocol comprises an automated demand response program, and wherein automatically initiating the at least one energy protocol comprises:
determining at least one off-peak time based on the energy usage data from the plurality of households; and
automatically controlling at least one cooling or heating appliance to operate based on the at least one off-peak time.

8. The system of claim 7, wherein the at least one energy protocol comprises an energy assistance program, and wherein automatically initiating the at least one energy protocol comprises:
automatically registering each household in the at least one group in the energy assistance program.

9. The system of claim 7, wherein the at least one energy protocol comprises an automated appliance protocol, and wherein automatically initiating the at least one energy protocol comprises:
detecting an appliance abnormality in at least one household based on at least one machine-learning model and the energy usage data; and
automatically communicating a message to the at least one household in response to detecting the appliance abnormality, the message identifying at least one appliance.

10. The system of claim 7, wherein the plurality of households are within a geographic region, and wherein determining at least one group of the plurality of groups based on the gap metric value and the inflection temperature for the at least a subset of households in the at least one group comprises:
determining a distance between the gap metric value and the inflection temperature for the at least a subset of households in the a least one group.

11. The system of claim 7, wherein the nonlinear regression model outputs a cooling or heating balance point, a slope of a component of the cooling or heating balance point, and a daily base load, and wherein determining the at least one group of the plurality of groups is based on the cooling or heating balance point, the slope of a component of the cooling or heating balance point, and the daily base load.

12. The system of claim 7, wherein automatically initiating the at least one energy protocol comprises:
automatically controlling, via a network connection, the at least one cooling or heating appliance of at least one household in at least one group based on the energy usage data.

13. A computer program product comprising at least one non-transitory computer-readable medium including program instructions that, when executed by at least one processor, cause the at least one processor to:
store, in at least one data storage device, energy usage data for a plurality of households;
store, in the at least one data storage device, environmental data associated with the plurality of households, the environmental data comprising outdoor temperature measurements;
determine an inflection temperature for each household of the plurality of households based on a nonlinear regression model, the nonlinear regression model configured to receive, as input, the outdoor temperature measurements and at least a portion of the energy usage data, and to output the inflection temperature;
determine a gap metric value based on a maximum median inflection temperature and a minimum inflection temperature from the plurality of households;
form a plurality of groups based on the plurality of households and household data associated with each household, each group comprising a subset of households of the plurality of households;
determine at least one group of the plurality of groups based on the gap metric value and the inflection temperature for at least a subset of households in the at least one group; and
automatically initiate at least one energy protocol for households in the at least one group, wherein the at least one energy protocol comprises an automated demand response program, and wherein automatically initiating the at least one energy protocol comprises:
determining at least one off-peak time based on the energy usage data from the plurality of households; and
automatically controlling at least one cooling or heating appliance to operate based on the at least one off-peak time.

* * * * *